Sept. 10, 1929.  J. MADARASZ  1,727,474
AUTOMATIC TIRE GAUGE
Filed Dec. 7, 1925
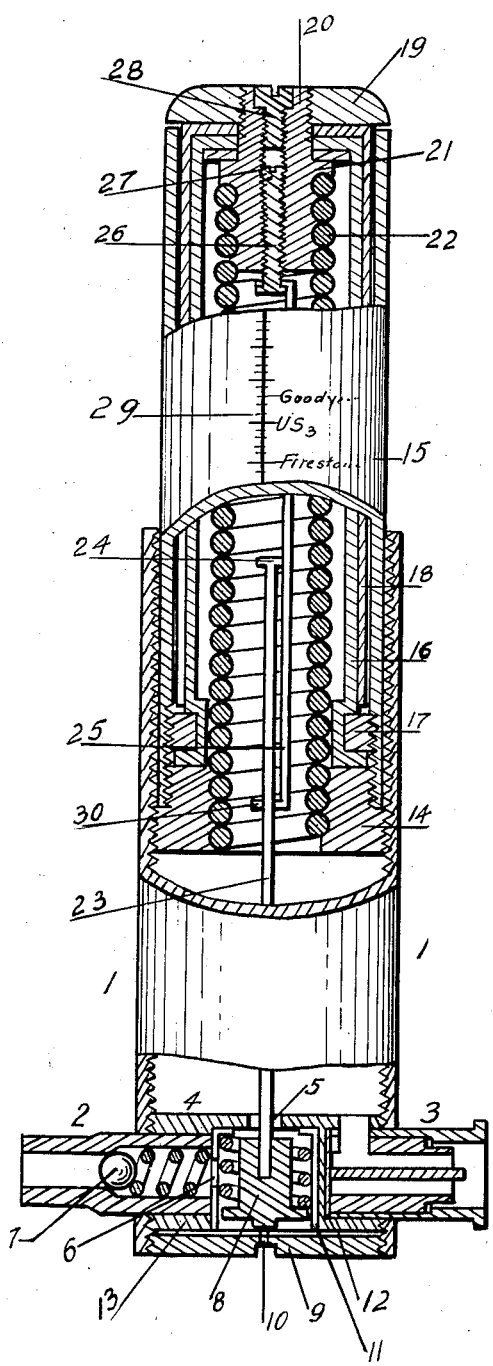
INVENTOR.
Julius Madarasz
BY Clark C Wrvrel
ATTORNEY.

Patented Sept. 10, 1929.

1,727,474

UNITED STATES PATENT OFFICE.

JULIUS MADARASZ, OF EAST LANSING, MICHIGAN.

AUTOMATIC TIRE GAUGE.

Application filed December 7, 1925. Serial No. 73,918.

My invention relates to an improved pressure gauge for automobile tires, with improved automatic shut off for the air when the desired pressure is reached.

I attain these purposes by the means shown in the accompanying drawing in which the figure is an elevation of one modification of my device, a part of the exterior walls being broken away to show the interior construction.

In the drawing, 1 is a metallic tube forming the main body of my device. It is provided at its lower end with a valved tube 2 of any suitable type adapted to connect with a source of compressed air supply. A second tube 3 is adapted to connect with the ordinary tire tube and may also be of any desired construction. The construction shown in the drawing is of a usual type customarily employed in tire gauges and does not seem to require further explanation. A partition 4 is inserted in the tube 1 above the body 1 which is preferably threaded on the inside and this partition screwed in to keep it in position but any other method of fastening it in position may be employed without departing from my invention. Openings 5 and 6 connect the interior of the tubes with the interior of the tube 2. A valve 7 normally keeps the tube 2 closed until opened by the pressure of the incoming air. A second valve 8 is inserted in the partition 4 and a second partition 9, closes the end of the tube 1. A small opening 10 is formed through the partition 9, having a purpose that will be explained in connection with the operation of the device. The valve 8 is normally kept in the position shown in the drawing by a spring 11. A packing 12 is introduced between the partitions 4 and 9 to prevent the escape of air. A ring 14 is screwed into the tube 1 which is threaded on its interior surface to receive it. The upper part of the ring 14 is made smaller and is threaded on its outer surface to engage with inner threads on an inner tube 15 and thus hold the two firmly together. In the form shown in Fig. 1, a third tube 16 formed of elastic rubber or some other readily extensible material is firmly attached to the ring 14 by a ring 17. Another metallic tube 18 is inserted within the tube 15. A cap 19 is mounted on the upper end of the tube 18 and is provided at its center with a threaded plug 20 which is flanged inside as shown at 21 so that when the cap 19 is screwed down it will firmly compress and hold in position the tubes 16 and 18. A spring 22 is attached at one end to the plug 20 and at the other end to the ring 14. A rod 23 is attached at one end to the valve 8 and is provided with a head 24 at the other. A second rod 25 is attached at the upper end to the screw 26 which is threaded into the plug 20 and is provided at its upper end with a slot 27 for purposes of adjusting the graduations to each other, as will be more fully explained hereafter. A screw 28 is inserted in the upper end of the threaded passage of the tube 20 for the purpose of closing this passage and may be removed to adjust the screw 26.

Graduations 29 are formed on the outside of the tube 15 for the purpose of adjustment as will be more fully explained in connection with the operation. If desired, the tube 18 may also be graduated on the outside for the purpose of reading the pressure within the tire.

The operation of my device is as follows:

When the tube 2 is connected to any source of compressed air the air rushes in forcing open the valve 7 and passing through the openings 6 and 5 into the interior of the tubes, but is prevented from escaping by the tube 16, and forces outward the tube 18 against the tension of the spring 22 and the elastic tube 16, until the flange 30 on the rod 25 engages with the head 24 on the rod 23. When this occurs the rod 23 rises, carrying with it the valve 8 and the passage 5 is closed so that no more air is admitted. At the same time this opens the passage 10 and permits a small portion of air to escape with a whistling sound notifying the operator that the required pressure is reached. Adjustment is made for the desired pressure by turning the tube 15 carrying with it the ring 14. When this tube 15 is turned inward it carries with it all the parts within it including the rod 25, and thus increases the travel of the tube 18 that will be necessary before the foot 30 of the rod 23, and thus close the valve 8, thus requiring a greater amount of pressure to close the valve. Conversely, by screwing the tube out, the required travel is less and the tension and pressure consequently also less. As already stated, the tube 15 is graduated on its outer surface to show the point to which it must be screwed in to show any desired pressure for the closing of the valve. If graduations are used on the tube 18, they should read the same as those on the tube 15 when the valve 5 closes. If they do not do so, the plug 28 may be removed and the position of the rod 25 adjusted by means of the screw 26.

While I have described the construction in the forms which I believe to be preferable, it is evident that the details of construction might be modified in many ways without departing from my invention. For example, the screw 26 and the rod 25 might be formed of one piece of metal or the tube 15 may be outside the body 1, and the tube 18 outside that, without departing from my invention.

I claim as my invention and desire to secure by Letters Patent:

In an automatic tire gauge, the combination of telescoped tubes with adjustable spring connections for indicating the pressure, one of said tubes being elastic, a valve connection admitting air to said gauge, means for relatively adjusting said tubes disposed at the end of said gauge, a shut-off valve for the said connection, a connecting rod from said shut-off valve axially disposed in said gauge tubes with a suitable stop head thereon, and a sliding connection in the telescoping part of said gauge for actuating the said connecting rod to shut off the valve when predetermined pressure is reached, and an alarm with valve connected to be opened when the cut-off is closed.

JULIUS MADARASZ.